J. BEAN.

PUMP.

No. 9,903. Reissued Oct. 18, 1881.

Witnesses,
Wm. L. Speiden,
H. Aubrey Faulmann

Inventor,
John Bean.
By C. M. Alexander,
his Atty.

N. PETERS, Photo-Lithographer, Washington, D. C.

UNITED STATES PATENT OFFICE.

JOHN BEAN, OF SPRINGFIELD, OHIO.

PUMP.

SPECIFICATION forming part of Reissued Letters Patent No. 9,903, dated October 18, 1881.

Original No. 125,008, dated March 26, 1872. Application for reissue filed August 17, 1881.

*To all whom it may concern:*

Be it known that I, JOHN BEAN, of Springfield, in the county of Clarke and State of Ohio, have invented certain new and useful Improvements in Pumps; and I do hereby declare the following is a full, clear, and exact description of the invention, that will enable others skilled in the art to which it appertains to make and use the same, reference being had to the accompanying drawings, and to the letters of reference marked thereon, which form a part of this specification.

My present invention is intended as an improvement upon the pump for which Letters Patent were granted to me February 9, 1869; and it consists in providing and arranging an outer air-chamber in such connection with the pump-cylinder as to communicate with the latter at a point between two pistons working therein, and in the arrangement and construction of the several other features, as will be hereinafter more fully set forth.

In order to enable others skilled in the art to which my invention appertains to make and use the same, I will now proceed to describe its construction and operation, referring to the annexed drawings, in which—

Figure 1:
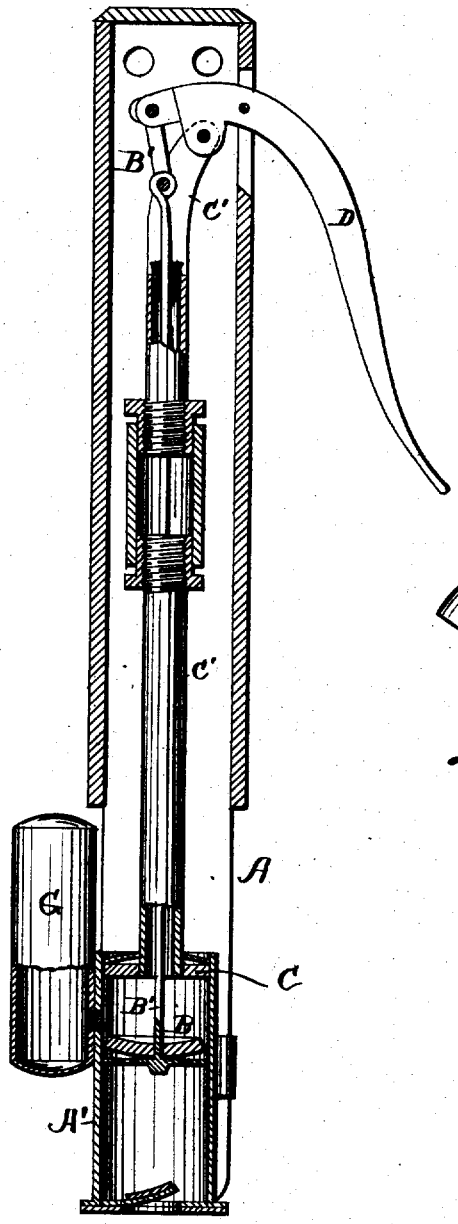
Figure 2:
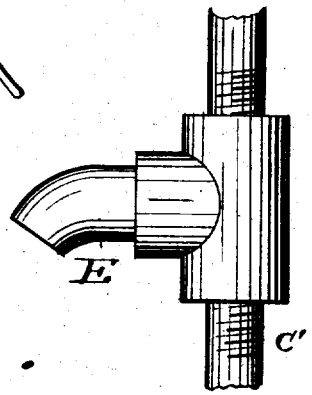

Figure 1 is a longitudinal vertical section of my improved pump, and Fig. 2 is an enlarged side view of the spout.

The letter A represents a pump stock or casing of rectangular or any approved form in cross-section. To this lower portion of the stock or case I attach my pump proper, the upper portion forming a house or receptacle for the actuating-rods and a fulcrum-support for the handle, the lower extremity being suitably connected to the pump-cylinder, which is by this means suspended the proper depth within the well or shaft to prevent freezing, and is of sufficient area in its cross-section to permit of the easy withdrawal of the pistons from above.

A′ represents the cylinder, in which are the suction-bucket B and the force-bucket C. The rod C′ of the force-bucket is made of gas-pipe or any other suitable pipe, the upper end of which is pivoted to the handle D a short distance from the pivot-point of said handle. The lower end of this tubular rod is open, forming a communication of the same with the cylinder A′ between the pistons. At a suitable distance above this point there is an aperture or water-discharge provided with a spout, E.

B′ is the rod of the suction-bucket B, which rod passes through the force-bucket C and the pipe C′, and its upper end pivoted to the inner end of the handle D, both the bucket-rods being pivoted on the same side of the pivot-point of the handle. The water passes up through the center pipe, C′, and out through the spout E, above mentioned, connected with said pipe in any suitable manner. The force-bucket C moves about one-half the distance of the suction-bucket B, giving a steady stream of water with a powerful leverage on the water, working admirably in deep wells.

Connected with the cylinder A′ is an air-chamber, G, arranged as shown, so that the air will regulate for both buckets—that is, it is attached in any convenient manner to the side thereof, and arranged to have its communication with the cylinder at a point between the pistons, as preambled, and adapted to regulate the air for both buckets or pistons in a more efficient manner, by being in the form of an elongated extended vessel or tube, as set forth.

Having thus fully described my invention, what I claim as new, and desire to secure by Letters Patent, is—

1. The combination, in one cylinder, A′, of the suction-bucket B and force-bucket C, the suction rod B′ passing through the force-bucket and its rod or pipe C′, both being attached to the same end of the handle D, and the water passing up through the center rod or pipe, C′, to and through the spout E, all substantially as herein set forth.

2. In combination with the cylinder A′, buckets B C, and rods B′ C′, constructed and arranged as described, the air-chamber G, arranged so that the air will regulate for both buckets, substantially as herein set forth.

3. In a double-piston pump, a tubular actuating-rod connected to the force-piston and opening into the cylinder below the same, substantially as shown.

4. In a pump, the upper part of the stock adapted to carry the handle, and the lower part to support the working mechanism of the pump, in combination with a cylinder and a communicating tubular air-chamber and discharge-pipe, for the purposes set forth.

5. In a pump, a pipe extending from the upper part thereof down to and opening into the cylinder, and having communication with a tubular air-chamber, for the purpose set forth.

6. In a double-piston pump, the combination of the cylinder thereof, having a suction and force piston, with an elongated air-chamber communicating therewith between the said pistons, substantially as shown.

7. In a pump, the combination of a double-piston cylinder, having an air-chamber and a discharge-opening communicating therewith between the pistons, with a stock connecting with the same, as and for the purpose set forth.

8. In a pump, a stock adapted to extend into the well, the upper part carrying a handle and the lower part connecting with a double-piston cylinder having a communicating air-chamber, as shown and described.

9. In a pump, a double-piston cylinder, in combination with a tubular air-chamber and discharge-pipe communicating with each other, substantially as described.

In testimony whereof I affix my signature in presence of two witnesses.

JOHN BEAN.

Witnesses:
J. H. RABBITTS,
CHAS. R. WHITE.